United States Patent [19]
Gentles et al.

[11] Patent Number: 6,144,853
[45] Date of Patent: Nov. 7, 2000

[54] METHOD AND APPARATUS FOR DIGITAL CORDLESS TELEPHONY

[75] Inventors: Thomas A. Gentles, Arlington Heights, Ill.; Jeffrey Paul Grundvig, Macungie, Pa.; Rajeev Krishnamoorthy, Middletown, N.J.; Pamela Kwong, Whitehall; Dale Harvey Nelson, Shillington, both of Pa.

[73] Assignee: Lucent Technologies Inc., Murray Hill, N.J.

[21] Appl. No.: 08/891,007

[22] Filed: Jul. 10, 1997

Related U.S. Application Data

[60] Provisional application No. 60/043,927, Apr. 17, 1997.
[51] Int. Cl.$^7$ .................................................. H04Q 7/00
[52] U.S. Cl. .......................... 455/426; 455/413; 455/462; 455/465; 375/245; 704/230
[58] Field of Search ..................................... 455/426, 412, 455/413, 414, 462, 465; 379/68, 67.1; 370/476, 474; 375/241, 242, 245; 704/230

[56] References Cited

U.S. PATENT DOCUMENTS

| | | | |
|---|---|---|---|
| 4,053,717 | 10/1977 | Snider . | |
| 5,081,668 | 1/1992 | Ito ............................................. | 379/58 |
| 5,333,175 | 7/1994 | Ariyavisitakul et al. .................. | 379/58 |
| 5,553,190 | 9/1996 | Ohya et al. ............................... | 395/2.1 |
| 5,555,287 | 9/1996 | Gulick et al. ............................. | 379/61 |
| 5,625,652 | 4/1997 | Petranovich ............................. | 375/355 |
| 5,722,040 | 2/1998 | Bjerede et al. ........................... | 455/76 |
| 5,774,840 | 6/1998 | Taumi et al. ............................. | 704/223 |

*Primary Examiner*—Curtis A. Kuntz
*Assistant Examiner*—Binh K. Tieu
*Attorney, Agent, or Firm*—John P. Veschi

[57] ABSTRACT

A method of transmitting a voice communications signal includes the steps of sampling the signal and creating digital representations of the samples. The digital representations are speech-coded to create speech-coded data which is converted to analog symbols. A carrier in the 46–49 MHz band is modulated by the analog symbols and transmitted. A method of receiving a voice communications signal includes the steps of receiving a modulated carrier in the 46–49 MHz band and demodulating the modulated carrier to recover analog symbols. The analog symbols are converted to digital samples, which are then converted to speech-coded data. The speech-coded data are decoded to produce digitized samples, which are converted to analog samples and filtered to produce the voice communications signal. A cordless telephone system according to the invention includes a handset and a base unit. The handset includes a microphone, a speaker, a first digital signal processor connected to the microphone and to the speaker, a first 46–49 MHz RF transceiver connected to the first digital signal processor, and a first antenna connected to the first 46–49 MHz transceiver. The base unit includes a second antenna, a second 46–49 MHz RF transceiver connected to the second antenna, a memory, and a second digital signal processor connected to the second 46–49 MHz RF transceiver, to the memory, and to a telephone line interface.

37 Claims, 9 Drawing Sheets

METHOD AND APPARATUS FOR DIGITAL CORDLESS TELEPHONY

Priority of U.S. Provisional Application No: 60/043,927 filed Apr. 17, 1997 is hereby claimed. Conventional cordless telephones operating, for example, in the 46–49 MHz band, consist of a handset and a base unit. Conventionally, analog signals are sent from the handset to the base unit while a user of the telephone speaks into a microphone in the handset. Similarly, analog signals are sent from the base unit to the handset as incoming signals are broadcast from the speaker in the handset. In the 46–49 MHz band, the communication link from the handset to the base unit is at one frequency, for example, 46 MHz, while the communication link from the base unit to the handset is at another frequency, for example, 49 MHz.

BACKGROUND OF THE INVENTION

The analog nature of the communication between the base unit and the handset results in drawbacks associated with the use of the conventional cordless telephone set. For example, the communication quality is not as good as can be achieved with a conventional wired phone wherein the handset and base unit are physically connected. Another drawback is that it is a fairly simple task for an eavesdropper to listen in on a telephone conversation when one of the parties is communicating on a conventional cordless telephone.

SUMMARY OF THE INVENTION

In accordance with one embodiment of the invention, a cordless telephone includes a handset and a base unit. The handset includes a microphone, a speaker, a first digital signal processor (DSP) connected to the microphone and to the speaker, and a first radio frequency (RF) transceiver connected to the first DSP. The handset also includes a first antenna connected to the first RF transceiver. The base unit includes a second antenna, a second RF transceiver connected to the second antenna, and a memory. The base unit further includes a second DSP which is connected to the second RF transceiver. The second DSP is also connected to the memory and to a telephone line interface.

The second DSP, in the base unit, can selectively code incoming calls received via the telephone line interface for storage in the memory. The second DSP can also selectively code incoming calls received via the telephone line interface for transmission via the second RF transceiver and second antenna to the handset. The second DSP can also selectively retrieve stored calls from memory for transmission to the handset. The base unit can further include a speaker coupled to the second DSP. In this case, the second DSP can selectively retrieve stored calls from memory for transmission from the speaker contained within the base unit.

In accordance with another embodiment of the invention, a method of transmitting a signal includes the steps of sampling the signal, creating digital representations of the samples, coding the digital representations to create coded data, converting the coded data to analog symbols, and transmitting the analog symbols. The analog symbols can be transmitted by, for example, modulating a carrier in a 46–49 MHz band by the analog symbols, and transmitting the modulated carrier. The step of converting the coded data to analog symbols can include converting the coded data to pulse shapes. These pulse shapes, after modulation, should have a frequency content limited to 20 KHz as specified by Federal Communications Commission regulations.

BRIEF DESCRIPTION OF THE DRAWING

The foregoing features will be more fully understood from the following detailed description taken in view of the drawings, wherein.

DETAILED DESCRIPTION

Figure 1:
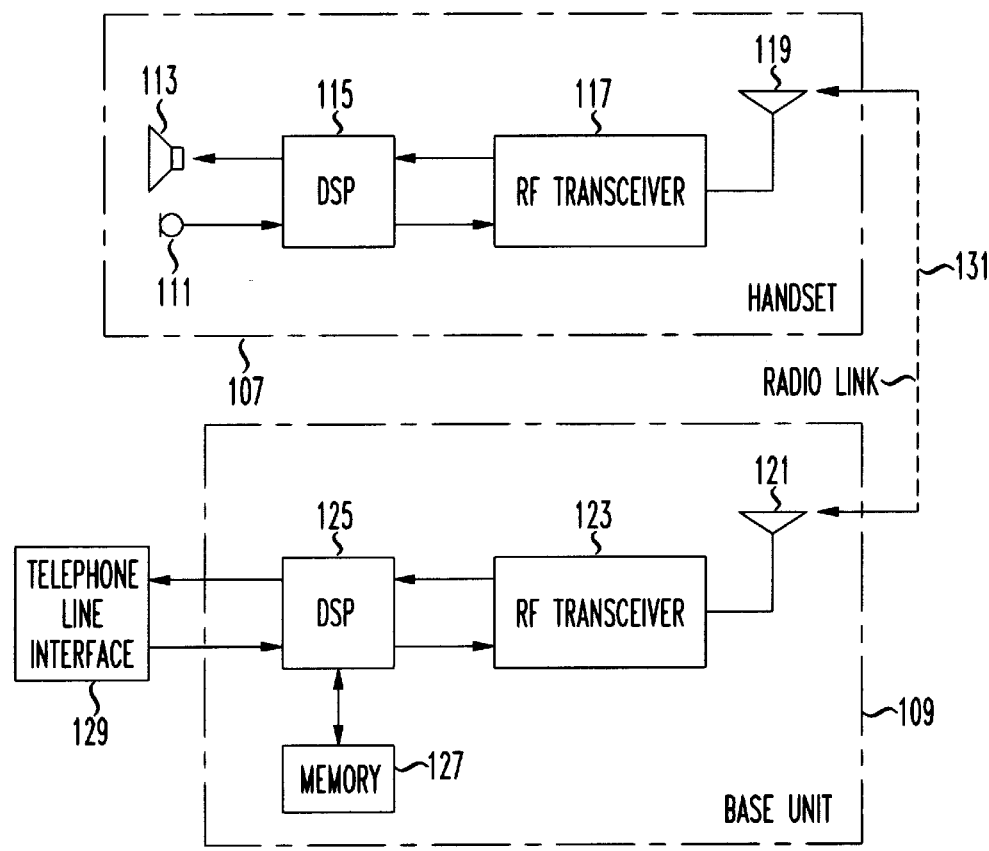
FIG. 1 is a simplified block diagram of a cordless telephone according to the invention.

FIG. 1 shows a block diagram of cordless phone 105, including handset 107 and base unit 109. Handset 107 includes a microphone 111, and a speaker 113, which are interconnected with a digital signal processor (DSP) 115. DSP 115 is coupled to RF transceiver 117 which is coupled to antenna 119. Base unit 109 includes antenna 121 which is coupled to RF transceiver 123. RF transceiver 123 is also coupled to DSP 125. DSP 125 is also coupled to memory 127 and to telephone line interface 129.

Base unit 109 and handset 107 are linked via radio link 131. Operationally, an incoming call is received in base unit 109 from telephone line interface 129. An indication of the incoming call is provided to a user, by, for example, a conventional ringing circuit. If a user responds to the indication by activating handset 107, the incoming call is processed by DSP 125 into digital form and forwarded to RF transceiver 123 for transmission via antenna 121 over radio link 131 to handset 107. In handset 107, the transmission over radio link 131 is received via antenna 119 into RF transceiver 117. The signal is then decoded by DSP 115. Speaker 113 is activated according to information contained in the signal decoded by DSP 115 to provide an acoustic signal to the user.

Similarly, the user can introduce a signal, such as an acoustic voice signal, into microphone 111. This signal is encoded by DSP 115 for transmission by RF transceiver 117 via antenna 119. The transmitted signal is received by RF transceiver 123 via antenna 121 and radio link 131. In one embodiment, DSP 125 decodes the transmission for subsequent transmission via the telephone line interface 129 to a communications network. Alternatively, DSP 125 can selectively pass the transmission in its encoded form to telephone line interface 129 or it can store the encoded transmission in memory 127.

When an incoming call is received via telephone line interface 129, and a user does not respond to the indication of the incoming call, the base unit 109 can selectively store the incoming call, or portions thereof, in memory 127. In this case, DSP 125 provides an incoming caller with an indication that a user has not activated handset 107. This indication is conventionally a prerecorded message which can be stored, for example, in digital form in memory 127. In response to actions taken by the incoming caller, DSP 125 can then store information to memory 127. The information stored to memory 127 can include a digitized version of an analog signal received by DSP 125 from telephone line interface 129. Further, the information can include other indicators-responsive to selections made by the incoming caller.

For example, DSP 125 can be programmed to issue instructions to an incoming caller which offer the incoming caller the option of pressing specific buttons on a telephone keypad used by the incoming caller in order to transmit certain information to the called party. DSP 125 can decode signals received over telephone line interface 129 that correspond to specific buttons pressed on the keypad of the incoming caller's telephone and can store corresponding information in memory for use by the called party at a later point in time.

An advantage of the embodiment according to the invention shown in FIG. 1 is that DSP 125 can make dual use of coding circuitry and software. The same circuitry and software that are used for coding to store information in memory 127 while performing telephone answering machine functions, can be used to code incoming signals, by, for example, speech-coding, so that these encoded signals can be digitally transmitted to handset 107. This dual use, of course, is merely by way of example and not of limitation. An implementation using distinct coders for these two functions still falls within the scope of the present invention.

Figure 2:
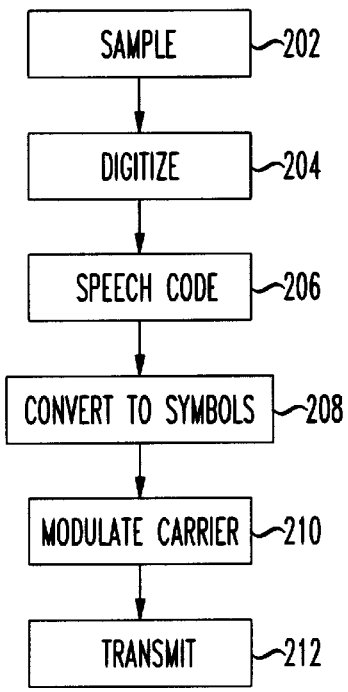
FIG. 2 is a flowchart showing a method of transmitting a voice communications signal according to the invention.

FIG. 2 shows a flowchart of a method of transmitting a voice communications signal according to the invention. The process shown in FIG. 2 can be carried out in either base unit 109 or handset 107. If carried out in base unit 109, the process operates on incoming analog signals received from telephone line interface 129. If operating in handset 107, the process operates on signals produced by microphone 111 in response to acoustic input thereto.

At step 202, a DSP, such as DSP 115 or DSP 125, samples the incoming signal at an appropriate sampling rate. An example of an effective sampling rate is 8,000 samples per second. Each sample is quantized to an appropriate quantization level. For example, each sample can be quantized to one of 8,192 levels, the value of the sample then being represented by a 13-bit stream. The quantization of the sample and conversion into a plurality of bits, such as the 13-bit stream, are accomplished by the DSP at step 204. In one example, the samples are segmented into 20 ms frames each comprising 160 samples. After step 204, each frame is thus represented by 160×13=2,080 bits. In step 206, each frame of 2,080 bits is speech coded. This speech coding step can comprise, for example CELP coding, linear predictive coding, or ADPCM coding. This coding step compresses the data to create speech-coded data. For example, in one embodiment, CELP coding reduces the number of bits per frame from 2,080 to 136. The speech-coded data are then converted to analog symbols at step 208. The RF transceiver then modulates a carrier in, for example, the 46–49 MHz band, with the symbols in step 210 and transmits a signal from the antenna 119 or 121 in step 212.

Figure 3:
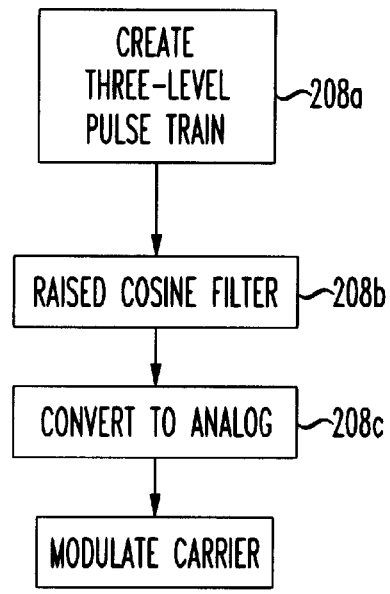
FIG. 3 is a flowchart showing an example of conversion step 208 of FIG. 2.

The conversion at step 208 can be a multi-step process. For example, as shown in FIG. 3, the conversion can begin at step 208*a* by first creating a threelevel pulse train from the speech-coded data. For example, each bit of data in the speech-coded data can have a value of +1 or −1, as is well known in the art of digital communication. A three-level pulse train can be created at step 208*a* by stuffing one or more zeroes, for example three zeroes, between each value. This "zero stuffing" process would thus convert, for example, a series appearing as "+1, +1, −1, +1, −1, −1, −1, +1," to a stuffed series appearing as "+1, 0, 0, 0, +1, 0, 0, 0, −1, 0, 0, 0, +1, 0, 0, 0, −1, 0, 0, 0, −1, 0, 0, 0, −1, 0, 0, 0, +1." This pulse train can then be introduced to a raised cosine filter to create a raised cosine pulse train. In one example, the raised cosine filter can, at step 208*b*, create digital representations of a raised cosine pulse train, with, on average, a given number of digital values making up each pulse.

Figure 4:
FIG. 4 is a diagram showing the signal conversions occurring during the process of FIG. 3.

For example, FIG. 4 shows an embodiment wherein an average of four digital values can be used for each pulse. Pulse train 402 comprises a stuffed series created by step 208*a*. Pulse train 402 is input to raised cosine filter 404. Raised cosine filter 404 produces digital values 406 at step 208*b*. These digital values can then be introduced at step 208*c* to digital-to-analog converter 408 for conversion into analog raised cosine pulse stream 410. In one embodiment, the raised cosines in pulse stream 410 are at an 8 Kbps rate and a frequency content of the pulse shapes is less than 10 KHz bandwidth. At step 210, the RF transceiver modulates the carrier based on the analog raised cosine pulse stream 410.

Figure 5:
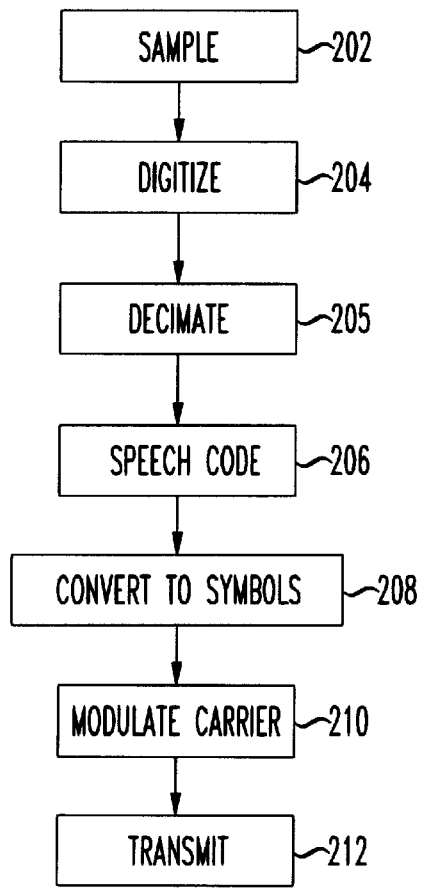
FIG. 5 is a flowchart showing an alternative method of transmitting according to the invention.

FIG. 5 shows an alternative method according to the invention. Here, the DSP that performs the digitizing at step 204 and speech-coding at step 206 also includes a decimation step 205 between these two steps. Thus, the digitized samples produced by step 204 are decimated prior to being used as input to the speech-coding step. In one example according to the invention, the sampling step 202 and digitizing step 204 occur at a 64 KHz frequency, and the output of the decimation step 205 is at an 8 KHz frequency.

Figure 6:
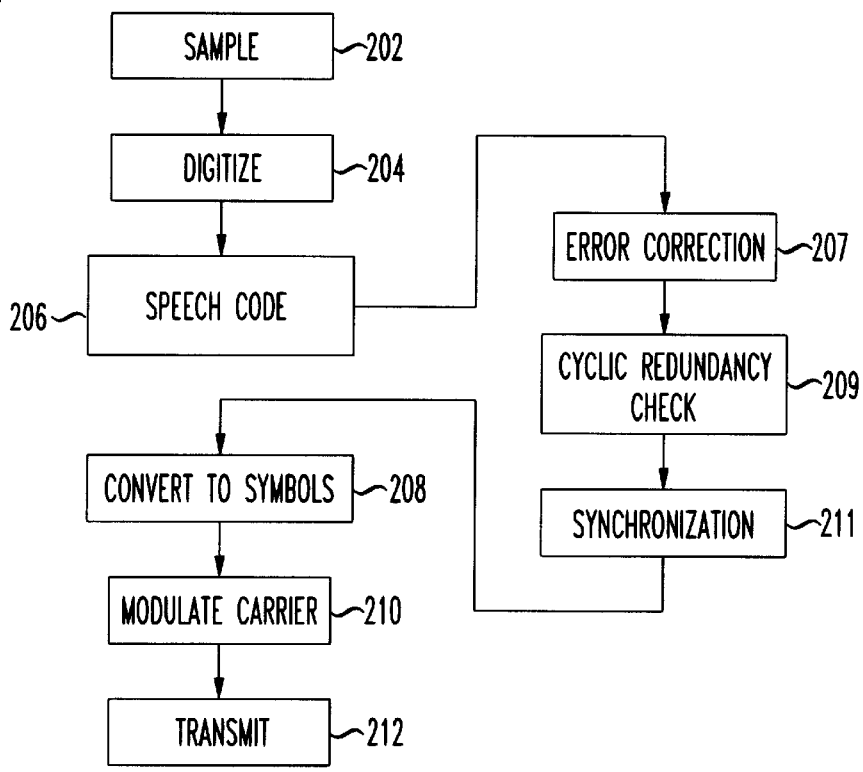
FIG. 6 is a flowchart showing another alternative method of transmitting according to the invention.

FIG. 6 shows an alternative method according to the invention. Here, the output of speech-coding step 206 goes through steps 207, 209 and 211 prior to modulating step 210 (in this case, also prior to converting step 208). These additional steps 207, 209 and 211 respectively add error correction, cyclic redundancy check (CRC), and synchronization bits to the bit stream resulting from the speech-coding step. For example, in the example described above with respect to FIG. 2, each frame of 2080 bits is coded into a 136 bit data stream at step 206. As a result of steps 207, 209 and 211, this stream is increased in length to 212 bits. The additional bits will be used at the receiving end (i.e. the receiving transceiver and receiving DSP) for purposes of error correction, checking cyclic redundancy, and synchronization, respectively.

Figure 7:
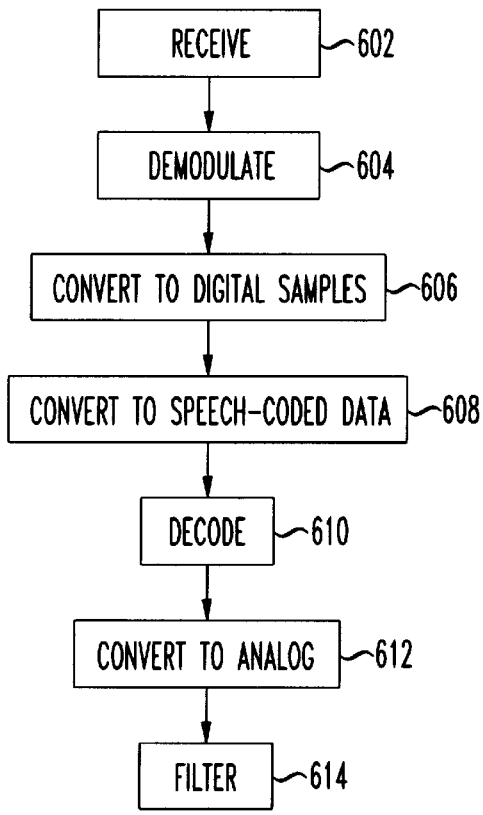
FIG. 7 is a flowchart showing a method of receiving a voice communications signal according to the invention.

FIG. 7 provides an example of a method of receiving a voice communications signal according to the invention. Here, a signal is received at step 602 by an RF transceiver such as RF transceiver 117 or 123 via corresponding antenna 119 or 121. The receiving transceiver then demodulates the signal at step 604 to recover analog symbols. These analog symbols are then converted to digital samples at step 606. The digital samples are converted to speech-coded data at step 608. At step 610, the speech-coded data are decoded to produce digitized samples. The digitized samples are converted to analog samples at step 612 and filtered at step 614 to produce the voice communications signal. If this process is occurring in base unit 109, the voice communications signal produced by this process is output from DSP 125 to telephone line interface 129. Alternatively, if this process is occurring in handset 107, the voice communications signal is output from DSP 115 to cause speaker 113 to output a corresponding acoustic signal.

Figure 8:
FIG. 8 is a diagram showing signal conversions during the receiving process.

FIG. 8 shows the results of steps 604 and 606 shown in FIG. 7. After demodulation at step 604, an analog data stream 802 comprising a plurality of raised cosines is recovered. Analog data stream 802 is similar to analog data stream 410 of FIG. 4. As a result of step 606, the analog data stream 802 is converted to digital samples 804. This conversion can be, for example, at an average frequency of two digital samples per pulse, yielding a sampling frequency of 16 K-samples/sec. Alternatively, the frequency can be at 32 K-samples/sec, corresponding to four digital samples per pulse. Each digital sample can have, for example, one of 8,192 possible values, and can be represented by 13 bits.

Figure 9:
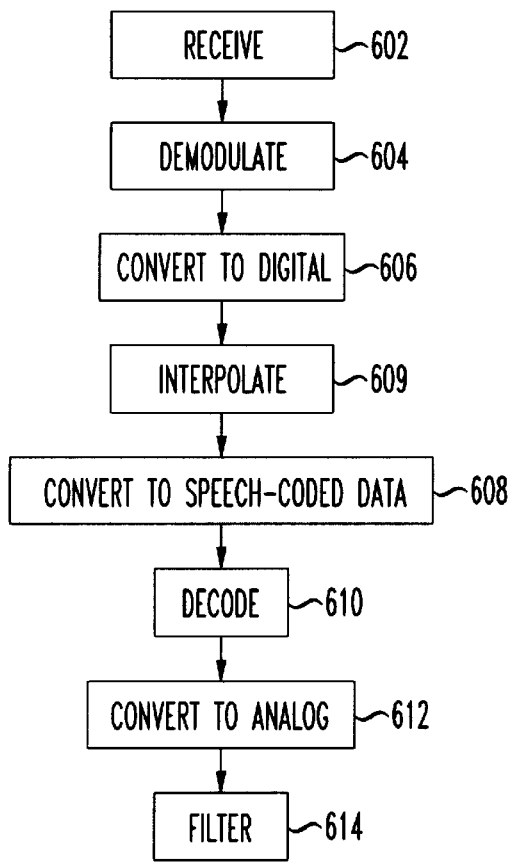
FIG. 9 is a flowchart showing an alternative method of receiving according to the invention.

FIG. 9 shows an alternative embodiment, including step 609. Here, the digital samples 804 are interpolated to produce a greater number of samples. For example, between each two successive samples, through interpolation, an additional three digital samples can be created to convert a 16 K-samples/sec sample stream to a 64 K-samples/sec sample stream. Alternatively, one additional sample can be created for each sensed sample to convert a 32 K-samples/sec sample stream to a 64 K-samples/sec sample stream. FIG. 8 shows the resulting stream 806. The intent of this step is to create a sample stream with a desired rate of samples. Thus, the interpolation factor depends on the sampling frequency of the stream prior to interpolation. With a target rate of 64 K-samples/second, the interpolation factor of four is selected for an input stream of 16 K-samples/second. Such an input stream corresponds to a sampling rate of two digital samples per pulse. If, alternatively, four digital samples per pulse are produced as a result of step 606, yielding 32 K-samples/second, then an interpolation factor of two, resulting in the addition by interpolation of one sample for each sensed sample, produces the desired 64 K-sample/second frequency.

As discussed earlier, the digital samples are converted to speech-coded data in step 608. This step performs the reverse function of that performed by raised cosine filter 404 of FIG. 4, producing a bit stream of +1's and −1's, such as stream 402, from the digital samples, such as samples 406. During this conversion, once the DSP synchronizes to the digital samples representing the centers of the pulses, the conversion step can include comparing the digital value of the central sample to a given threshold. If the value is greater than the threshold, a +1 can be output. If, on the other hand, the value is less than the threshold, a −1 can be output.

Figure 10:
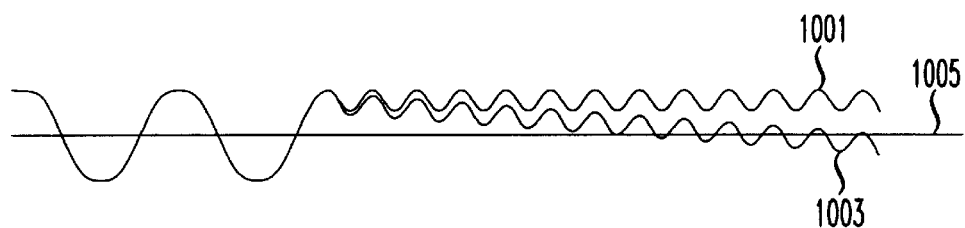
FIG. 10 shows the effect of filtering on a pulse stream.

A practical problem can arise when using such a thresholding approach. A contributing factor to this problem is low frequency noise that is often present on a communications signal received by the handset from the base unit or on a communications signal received by the base unit from the handset. Transceivers 117 and 123 incorporate filters, such as high pass filters, to eliminate the effects of this low frequency noise. However, as shown in FIG. 10, the filters can cause the signal level of a string of 1's to drift downward. Here, 1001 refers to a portion of a raised cosine pulse stream corresponding to a plurality of 1's when the filter is not present, and 1003 refers to a similar plurality of 1's with the filter present. If level 1005 represents the threshold, then the use of the filter may cause some 1's to be misinterpreted as −1's, thus introducing error.

To solve this problem, one embodiment according to the invention determines the value (i.e., 1 or −1) of a present raised cosine pulse by comparing the magnitude of the present raised cosine pulse (i.e., the magnitude of the digital representation sampled or interpolated near the center of the pulse) with the magnitude of a previous raised cosine pulse. For example, if the difference between magnitudes exceeds a threshold, then the value of the present raised cosine pulse can be determined to be the opposite value of the previous raised cosine pulse, and if the difference between magnitudes is less than the threshold, the value of the present raised cosine pulse can be determined to be the same as the value of the previous raised cosine pulse.

Figure 11:
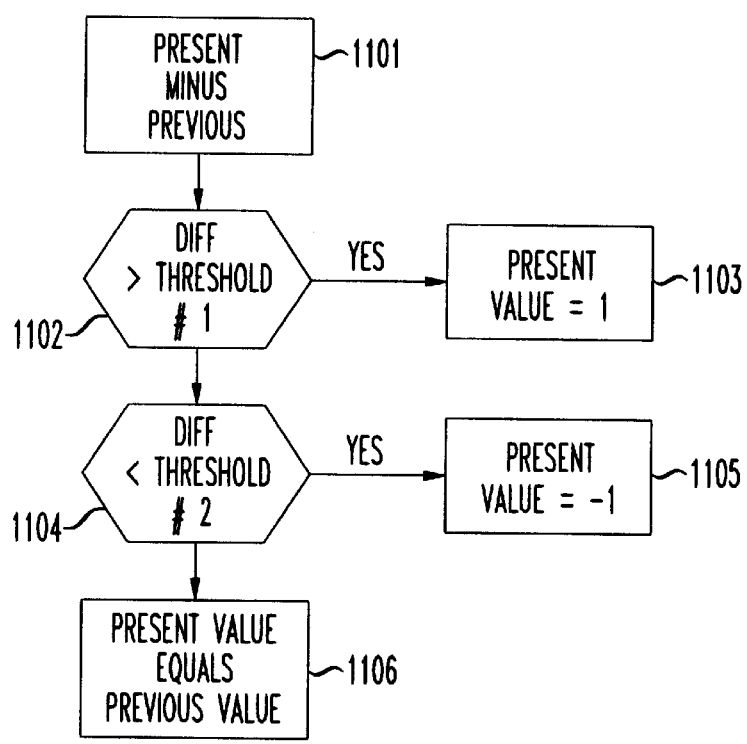
FIG. 11 shows an example of a process for determining the value of a raised cosine pulse.

FIG. 11 shows an example of a process for determining the value a raised cosine pulse according to the invention. At step 1101, the value of the present raised cosine pulse is compared to the value of the previous raised cosine pulse to create a difference value representative of the present raised cosine pulse value minus the previous raised cosine pulse value. At step 1102, the difference is compared to a first threshold. If the difference value is greater than the first threshold, then the present raised cosine pulse value is evaluated as a "1" at step 1103. If the difference value is not greater than the first threshold, it is compared to a second threshold at step 1104. If the difference value is less than the second threshold value, then the present raised cosine pulse value is evaluated as a "−1" at step 1105. If the difference is between the first threshold and the second threshold, then the present raised cosine pulse value is evaluated as the same as the previous raised cosine pulse value at step 1106.

The first and second threshold can be predetermined or can be adjusted based on variations in the raised cosine pulse stream. In one example, the maximum peak-to-peak variation in the raised cosine pulse stream is determined. This maximum variation is divided by two to yield the first threshold. The sign of the first threshold is then changed to minus to yield the second threshold. In this example, therefore, if the difference value determined at step 1101 is greater than the maximum peak-to-peak variation divided by two, then at step 1102 the answer is YES, and at step 1103 the value of the present raised cosine pulse is set as a 1; if the difference value is less than minus the maximum peak-to-peak divided by two, then at step 1102 the answer is NO and at step 1104 the answer is YES, so that at step 1105 the value of the present raised cosine pulse is set as a −1; and if the difference is between minus the maximum peak-to-peak divided by two and positive the maximum peak-to-peak divided by two, then at both steps 1102 and 1104 the answer is NO, and at step 1106 the value of the present raised cosine pulse is set to be the same as the value of the previous raised cosine pulse.

The first and second threshold can vary depending on whether the present raised cosine pulse is part of a stream of like valued raised cosine pulses. For example, as seen in FIG. 10, the raised cosine pulses in pulse string 1003 have successively lower magnitudes. The magnitudes of the first and second thresholds can thus be set at an initial high value at the beginning of a string of like valued raised cosine pulses, and can subsequently be set at successively lower values as the string of like valued raised cosine pulses continues. Thus, the thresholds for the n-th raised cosine pulse in the string of like valued raised cosine pulses can be lower in magnitude than the thresholds for the n−1th raised cosine pulse in the string. When the string ends, or when a string of opposite polarity begins, the magnitudes of the thresholds can then begin to incrementally return towards their initial values.

In addition to varying the thresholds over time, as discussed above, the thresholds can vary based on the characteristics of the filter used to remove the low frequency noise, which may also be variable. Thus, for example, if the filter characteristics adapt to filter out a greater level of noise, then the variations in the thresholds can be more aggressive. Similarly, if the filter characteristics adapt to filter out less noise, then the variations in the thresholds can be less aggressive. Further, a noise floor can be periodically measured, for example, during a known pattern, such as a synchronization pattern, and the thresholds, as well as the filter characteristics, can be adjusted accordingly. In such a case, it is possible to adjust these values to be optimized for each frame and for each pulse within a frame based on one or more of the noise floor, the filter characteristics and the number of successive like values preceding each raised cosine pulse.

Figure 12:
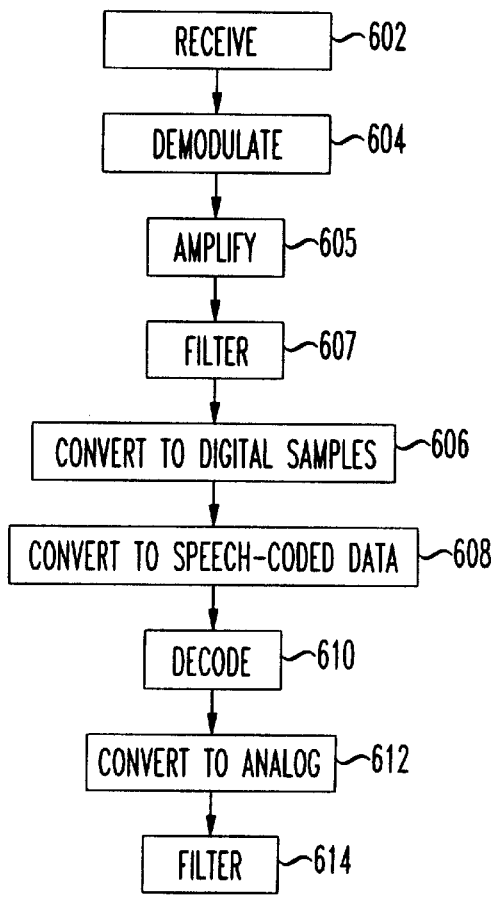
FIG. 12 shows yet another method of receiving.

FIG. 12 shows an alternative method of receiving a voice communications signal that includes steps 605 and 607. At step 605, the analog symbols produced by step 604 are amplified. These amplified symbols are then filtered at step 607 prior to being converted to digital samples and speech-coded data at steps 606 and 608. Step 607 can comprise, for example, lowpass filtering. Other methods of filtering, such as, for example, bandpass filtering are also possible.

Figure 13:
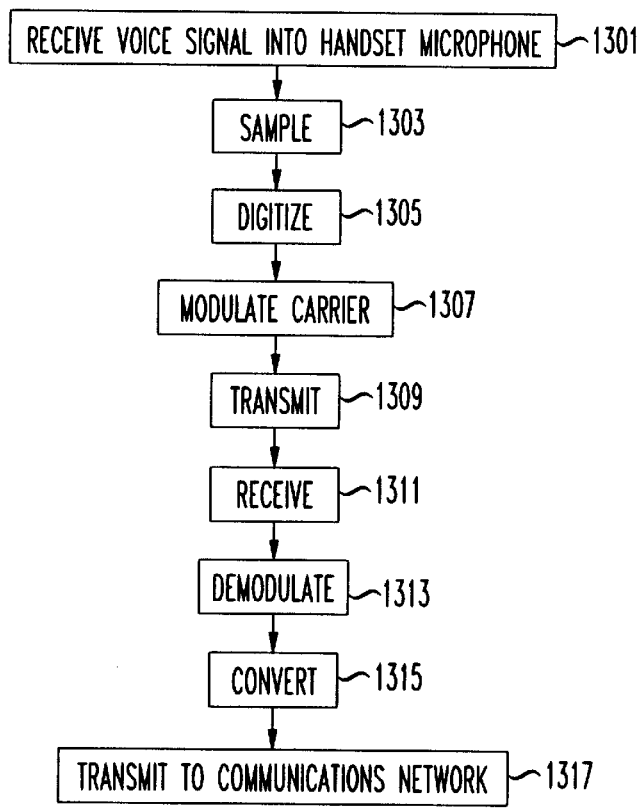
FIG. 13 shows a method of communicating via a cordless telephone in accordance with the invention.

FIG. 13 shows a method of communicating via a cordless telephone in accordance with one embodiment of the invention. In step 1301, a voice signal is received into a microphone, such as microphone 111. In step 1303, the received voice signal is sampled. The samples produced by sampling step 1303 are digitized in step 1305. A carrier in the 46–49 MHz band is modulated according to information contained in the digitized samples in step 1307. The modulated carrier is then transmitted in step 1309. The modulated carrier can be received in the base unit in step 1311. In step 1313, the carrier is demodulated to recover analog symbols. The analog symbols are converted to recover coded data in step 1315. The coded data can then be transmitted to the communication network in step 1317.

Figure 14:
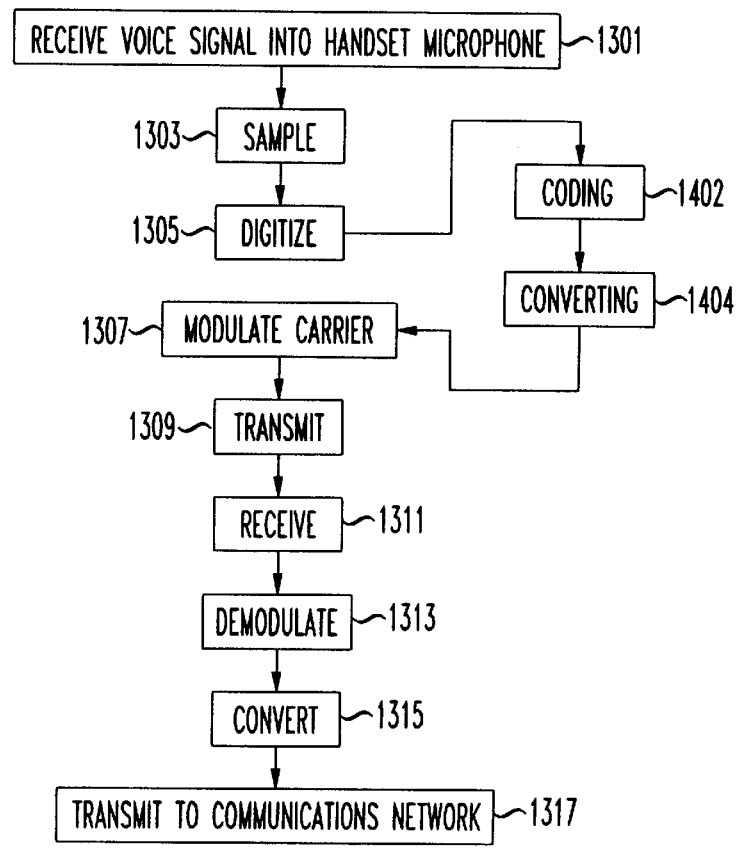
FIG. 14 shows an alternative method of communicating.

FIG. 14 shows an alternative method according to the invention including steps 1402 and 1404. Here, the digitized samples produced in step 1305 are coded in step 1402 to produce coded data. The coded data are then converted into analog symbols in step 1404. These analog symbols are then used to modulate the carrier in step 1307.

In the methods shown in FIGS. 13 and 14, as a result of step 1317, the coded data resulting from step 1315 are transmitted to a communications network.

Figure 15:
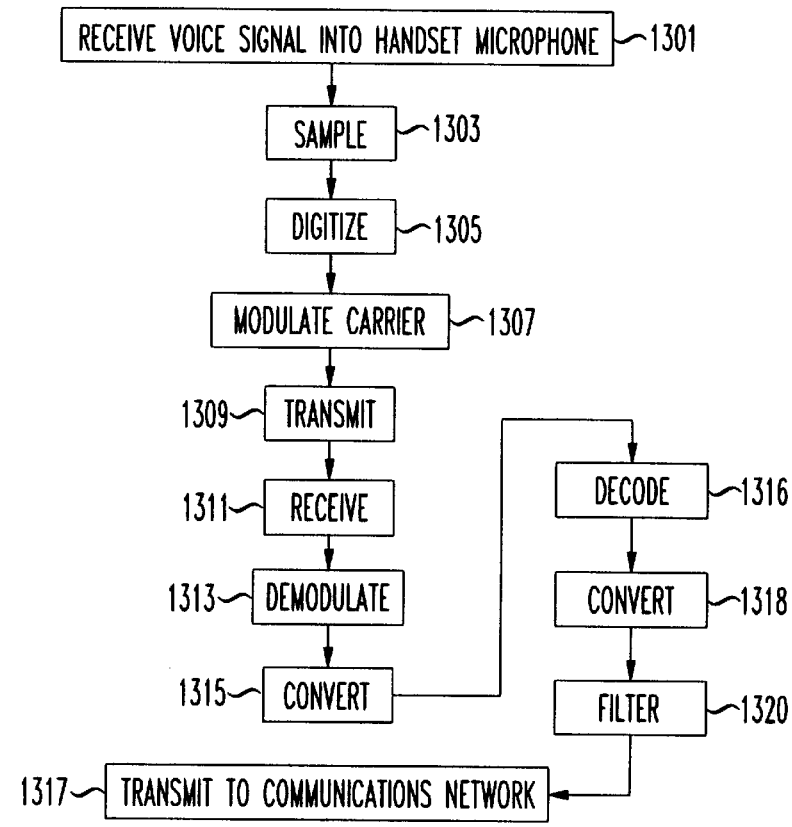
FIG. 15 shows another alternative method of communicating.
Figure 16:
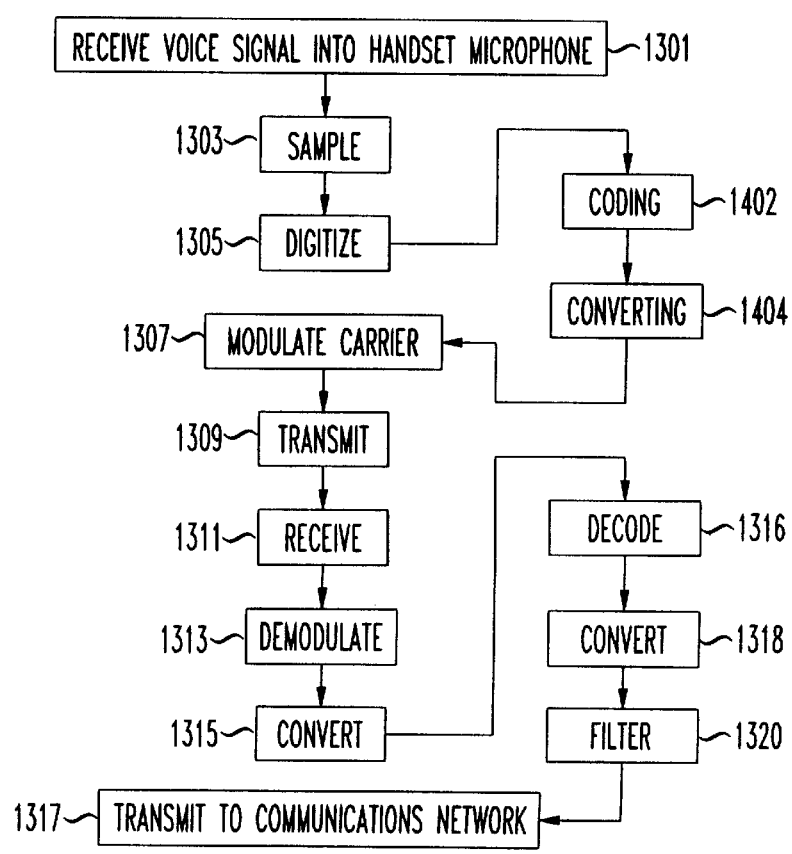
FIG. 16 shows yet another alternative method of communicating.

Alternatively, as shown in FIGS. 15 and 16, the coded data produced in step 1315 can be decoded in step 1316 to recover the digitized samples. The digitized samples can then be converted in step 1318 to analog samples. The analog samples can then be filtered in step 1320 to recover the voice signal. The voice signal can then be transmitted to the communications network in step 1317.

During a call setup period, handset 107 and base unit 109 may go through a handshaking process. During this process, functions such as channel impulse response estimation, automatic gain control, and timing recovery can be performed. Training frames can be used with speech frames for this purpose. An initial training frame can be sent by the handset if a call is being initiated, or by the base unit if a call is being received. The training frames can be, for example, approximately 110 bits long, including, for example, a ramp of approximately 10 bits, followed by approximately 45 frame synchronization bits, followed by a preamble of approximately 50 bits and a control field of approximately 4 bits.

The ramp bits allow the receiver (i.e. the receiving portion of transceiver 123 in base unit 109 if handset 107 initiates the training frame) to sense energy in the air (i.e., carrier sense) and prepare to receive frames. The receiver can use this time to estimate the received signal level and begin automatic gain control. The frame synchronization bits comprise a known pattern which is correlated by the receiver to recognize a start of frame delimiter. The preamble also comprises a known bit pattern, and enables the receiver to perform functions such as channel impulse response estimation. Finally, the control field can be used to convey any required signaling or control information. Examples of such control information include requests for further initialization, end of call indications, and channel change requests.

Speech frames can be, for example, approximately 125 bits in length. These frames may begin with a small number of ramp bits. These frames also can include, for example, a small number of (i.e. <5) frame synchronization bits, a short preamble of approximately 10 bits, followed by a control field of approximately 4 bits, followed by a field of coded data of approximately 100 bits, and completed with a cyclic redundancy check field of approximately 8 bits.

To establish handshaking, a receiving device can transmit back the training frame to the transmitting device. Preferably, a mechanism is established to confirm receipt of the training frame by the transmitting device, such that the failure to receive such a confirmation can cause retransmission of the training frame. Such a mechanism will help to reestablish a connection in the event that the receiving device goes off-track.

For example, the training frame can be repeated periodically, for example, once every second, by both handset 107 and base unit 109. Although the training frame replaces a speech frame, the loss in voice quality can be minimized by use of a frame erasure algorithm that fills in for a missing speech frame through extrapolation and attenuation. Instead of transmitting the training frame at a fixed interval, the receiver can be triggered into sending a training frame by the receipt of a specific number of erroneous frames.

Another alternative is to use both the fixed interval approach and the triggering approach, such that a training frame is sent, for example, once each second and whenever the specific number of erroneous frames are received. In such a case, if either handset 107 or base unit 109 receives a training frame that is not based on the fixed interval approach, then it should likewise send a training frame to the other device because it now knows, by receipt of the non-periodic training frame, that the other device is experiencing problems.

To increase reliability, antenna diversity can be employed. In such a case, antenna 119 in handset 107 represents a combination of at least two alternative antennae. Similarly, antenna 121 in base unit 109 represents a combination of at least two alternative antennae. One type of antenna diversity, known as Switched Diversity, provides for the receiver to sense the received signal strength when operating with a first antenna. If the signal strength drops below a threshold, the receiver switches to another antenna. In another type of antenna diversity, known as Selection Diversity, the frame synchronization field of the training frame is configured to be in three segments, each segment optionally being the length of a conventional synchronization field. During the first segment of the synchronization field, the receiver measures the gain in a first antenna. During the second segment, the receiver measures the gain in a second antenna. The third segment is used to select one of the two antennae and recalculate the gain of the selected antenna.

Sensing the received power can also be used to conserve battery life in handset 107. One or both of handset 107 and base unit 109 can sense the power of incoming signals. Based on this information, handset 107 can control its transmit power so that it does not needlessly transmit at excessive power. Thus, handset 107 avoids needlessly wasting battery life.

Since stronger signals are less error prone, the sensed power can also be used to determine whether to use error correction, or to select a quantity of error correction bits to be employed. For example, when the signal is strong, a less robust error correction scheme can be employed, requiring fewer error correction bits, and when the signal is weak, a more robust error correction scheme can be employed, requiring a larger number of error correction bits. Further, a filter bandwidth can be adjusted based on the selected error correction scheme or selected number of error correction bits.

Another method of extending battery life is to cut out unnecessary transmissions by recognizing that communications, at least for short periods of time, will frequently be in one direction. Thus, a continuous full duplex link is not always necessary. The link can thus be adapted based on detection of silence and speech activity. When a full duplex link is not needed, for example, the system can provide a link in only one direction. Further, if power conservation is not paramount, and improved voice quality or increased range is desired, the one direction link can operate on both frequencies (i.e. both 46 and 49 MHz).

A cordless telephone according to the invention can also include conventional scrambling and interleaving techniques, as are known to those of skill in the art, to randomize errors and improve performance. A cordless telephone system according to the invention operates in the 46–49 MHz region but, unlike conventional systems operating at these frequencies, provides for digital transmission between the base unit and the handset. Such a system provides higher quality communications. Having described exemplary embodiments of this invention, it would now be apparent to one of skill in the art that other embodiments incorporating its concept may be used. Therefore, this invention should not be limited to the disclosed embodiments, but rather should be limited only by the spirit and scope of the appended claims.

What is claimed is:

1. A method of assigning one of two discrete values to a signal sample within a string of samples, comprising the steps of:
   comparing the sample to a previously valued sample, and basing the value assigned to the sample on a difference between the sample and the previously valued sample by assigning the sample a first value if the difference is greater than a first threshold, assigning the sample a second value if the difference is less than a second threshold, and assigning the sample a same value as the previously valued sample if the difference is between the first threshold and the second threshold.

2. A method of assigning one of two discrete values to a sample within a string of samples, comprising the steps of:
   comparing the sample to a previously valued sample, and basing the value assigned to the sample on a difference between the sample and the previously valued sample by assigning the sample a first value if the difference is greater than a first threshold, assigning the sample a second value if the difference is less than a second threshold, and assigning the sample a same value as the previously valued sample if the difference is between the first threshold and the second threshold, wherein the samples pass through a filter prior to having values assigned thereto, the method further comprising the step of varying a magnitude of at least one of the first and second thresholds based upon characteristics of the filter.

3. A method as recited in claim 1, further comprising the step of varying a magnitude of at least one of the first and second thresholds based on whether the sample to be valued is preceded by a plurality of samples having like values.

4. A method as recited in claim 1, wherein the varying step varies the magnitude based on a number of like valued samples preceding the sample to be valued.

5. A method, as recited in claim 1, further comprising the step of setting at least one of the thresholds based on a maximum peak-to-peak variation in the string of samples.

6. A method, as recited in claim 5, wherein the first threshold is set to one-half the maximum peak-to-peak variation.

7. A method, as recited in claim 5, wherein the second threshold is set to have the same magnitude and opposite sign of the first threshold.

8. A method as recited in claim 6, wherein the second threshold is set to have the same magnitude and opposite sign of the first threshold.

9. A method, as recited in claim 1, further comprising the steps of:
   measuring a noise floor; and
   adjusting at least one threshold based on the noise floor.

10. A method of receiving a signal, comprising the steps of:
    receiving a modulated carrier;
    demodulating the modulated carrier to recover analog symbols;
    amplifying the analog symbols;
    filtering the amplified symbols;
    converting the filtered symbols to digital samples;
    converting the digital samples to coded data;
    decoding the coded data to produce digitized samples;
    converting the digitized samples to analog samples; and
    filtering the analog samples to produce the signal,
    wherein the step of converting each digital sample to speech-coded data includes the steps of
       comparing the digital sample with a previously converted sample;
       converting the sample to a value 1 if a difference between the sample and the previous sample is greater than a first threshold,
       converting the sample to a value −1 if the difference is less than a second threshold, and
       converting the sample to a same value as the previously converted sample if the difference is between the first threshold and the second threshold.

11. A method as recited in claim 10, further comprising the step of varying a magnitude of at least one of the first and second thresholds based upon characteristics of a filter used in the step of filtering the amplified symbols.

12. A method as recited in claim 10, further comprising the step of varying a magnitude of at least one of the first and second thresholds based on a noise floor.

13. A method as recited in claim 10, wherein the first threshold and the second threshold are periodically modified based on a measurement made during a training sequence.

14. A method of communicating via a cordless telephone, comprising the steps of:

receiving an analog signal in a base unit from a network;

digitally encoding the analog signal;

modulating a carrier in the 46–49 MHz band based on information contained in the digitally encoded signal;

transmitting the modulated carrier;

receiving the modulated carrier in a handset;

transmitting an acoustic signal from a speaker in the handset based on information contained in the modulated carrier;

transmitting a periodic training frame from an originating device of the base unit and the handset to a receiving device of the base unit and the handset; and retransmitting the periodic training frame from the receiving device to the originating device to establish handshaking.

15. A method as recited in claim 14, further comprising the step of:

measuring a power level of the received modulated carrier for use in adjusting a transmit power associated with signals to be transmitted between the base unit and the handset.

16. A method as recited in claim 15, further comprising the step of selecting a quantity of error correction bits based on at least one of the power level of the received modulated carrier and the transmit power associated with the signals to be transmitted.

17. A method as recited in claim 16, further comprising the step of adjusting a filter bandwidth based on the selected number of error correction bits.

18. A method as recited in claim 14, further comprising the steps of:

demodulating the modulated carrier to recover analog symbols;

converting the analog symbols to digital samples;

converting the digital samples to speech-coded data;

decoding the speech-coded data;

converting the decoded data to analog form;

filtering the converted data into an analog signal; and transmitting the acoustic signal corresponding to the analog signal.

19. A method as recited in claim 14, further comprising the steps of:

determining, in the originating device, if the training frame is received from the receiving device within a predetermined period of time; and transmitting another training frame from the originating device if the determination is that the training frame is not received within the predetermined period of time.

20. A method as recited in claim 14, further comprising the steps of:

counting, in the receiving device, a number of erroneous frames received; and transmitting a non-periodic training frame from the receiving device to the transmitting device if the number of erroneous received frames exceeds an error threshold.

21. A method as recited in claim 20, further comprising the step of:

transmitting another non-periodic training frame from the originating device in response to the non-periodic training frame transmitted by the receiving device.

22. A method of communicating via a cordless telephone, comprising the steps of:

receiving an analog signal in a base unit from a network;

digitally encoding the analog signal;

modulating a carrier based on information contained in the digitally encoded signal;

transmitting the modulated carrier from the base unit to a handset;

transmitting a periodic training frame from an originating device of the base unit and the handset to a receiving device of the base unit and the handset; and retransmitting the periodic training frame from the receiving device to the originating device to establish handshaking.

23. A method as recited in claim 22, further comprising the steps of:

determining, in the originating device, if the training frame is received from the receiving device within a predetermined period of time; and transmitting another training frame from the originating device if the determination is that the training frame is not received within the predetermined peiod of time.

24. A method as recited in claim 22, further comprising the steps of:

counting, in the receiving device, a number of erroneous frames received; and transmitting a non-periodic training frame from the receiving device to the transmitting device if the number of erroneous received frames exceeds an error threshold.

25. A method as recited in claim 24, further comprising the step of:

transmitting another non-periodic training frame from the originating device in response to the non-periodic training frame transmitted by the receiving device.

26. A method as recited in claim 1, wherein the method is for use in a system of practical application.

27. A method as recited in claim 1, wherein the method is for use in an electronic system.

28. A method as recited in claim 1, wherein the method is for use in a signal processing system.

29. A method as recited in claim 1, wherein the method is for use in a communication system.

30. A method as recited in claim 1, wherein the method is for use in a telecommunication system.

31. A method as recited in claim 1, wherein the method is for use in a telephone system.

32. A method as recited in claim 1, wherein the method is for use in a cordless telephone system.

33. A method as recited in claim 1, wherein the method is for use in processing a signal.

34. A method as recited in claim 1, wherein the method is for use in one of:

A system of practical application;

an electronic system;

a signal processing system;

a communication system;

a telecommunication system;

a telephone system;

a cordless telephone system; and processing a signal.

35. A method of converting a signal sample within a string of samples to one of two discrete values comprising the steps of:

comparing the sample to a previously valued sample, and basing the value assigned to the sample on a difference between the sample and the previously valued sample by assigning the sample a first value if the difference is greater than a first threshold, assigning the sample a second value if the difference is less than a second threshold, and assigning the sample a same value as the previously valued sample if the difference is between the first threshold and the second threshold.

36. A method as recited in claim 35, wherein the signal sample is a raised cosine pulse, and wherein the two digital values are +1 and −1.

37. A method as recited in claim 35, further comprising the step of storing the one discrete value in a memory.

* * * * *